United States Patent [19]
Cooper

[11] 3,946,165
[45] Mar. 23, 1976

[54] METHOD AND APPARATUS FOR CONTROL OF CROSSTALK IN MULTIPLE FREQUENCY RECORDING

[76] Inventor: Duane H. Cooper, 918 W. Daniel St., Champaign, Ill. 61820

[22] Filed: May 9, 1974

[21] Appl. No.: 468,279

Related U.S. Application Data

[63] Continuation-in-part of Ser. Nos. 187,065, Oct. 6, 1971, Pat. No. 3,856,992, and Ser. No. 288,873, Sept. 13, 1972, Pat. No. 3,906,156.

[30] Foreign Application Priority Data
May 10, 1973 Japan.................................. 48-52076

[52] U.S. Cl............... 179/100.1 TD; 179/100.4 ST; 179/15 BT; 179/1 G; 179/1 GQ
[51] Int. Cl.²............................................. H04R 5/00
[58] Field of Search....... 179/100.4 ST, 15 BT, 1 G, 179/1 GQ, 100.1 TD

[56] References Cited
UNITED STATES PATENTS

| | | |
|---|---|---|
| 3,401,237 | 9/1968 | Takayanagi................ 179/100.1 TD |
| 3,761,628 | 9/1973 | Cooper....................... 179/100.1 TD |

*Primary Examiner*—Terrell W. Fears
*Attorney, Agent, or Firm*—Fitch, Even, Tabin & Luedeka

[57] ABSTRACT

A method and apparatus is disclosed for reducing distortion between signals that are recorded on a recording medium in a multiple-frequency manner. More specifically, the present invention is directed to reducing or eliminating crosstalk from a main channel signal to a sub-channel signal that is caused by tracing distortion produced in a higher frequency range of the sub-channel signal. The reduction of crosstalk is achieved by reverse compensating a sub-channel signal during recording by an anticipated amount of tracing distortion.

13 Claims, 9 Drawing Figures

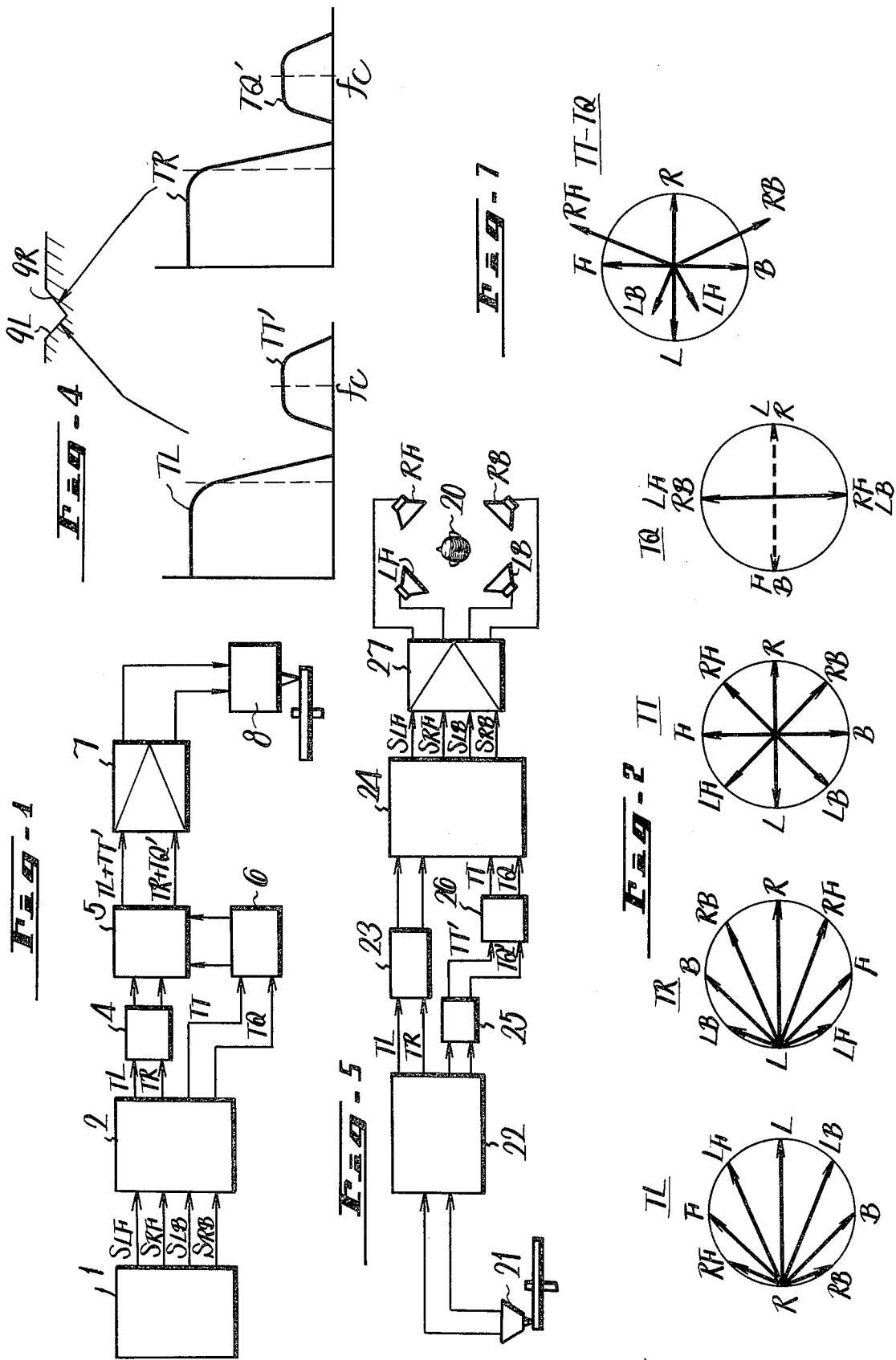

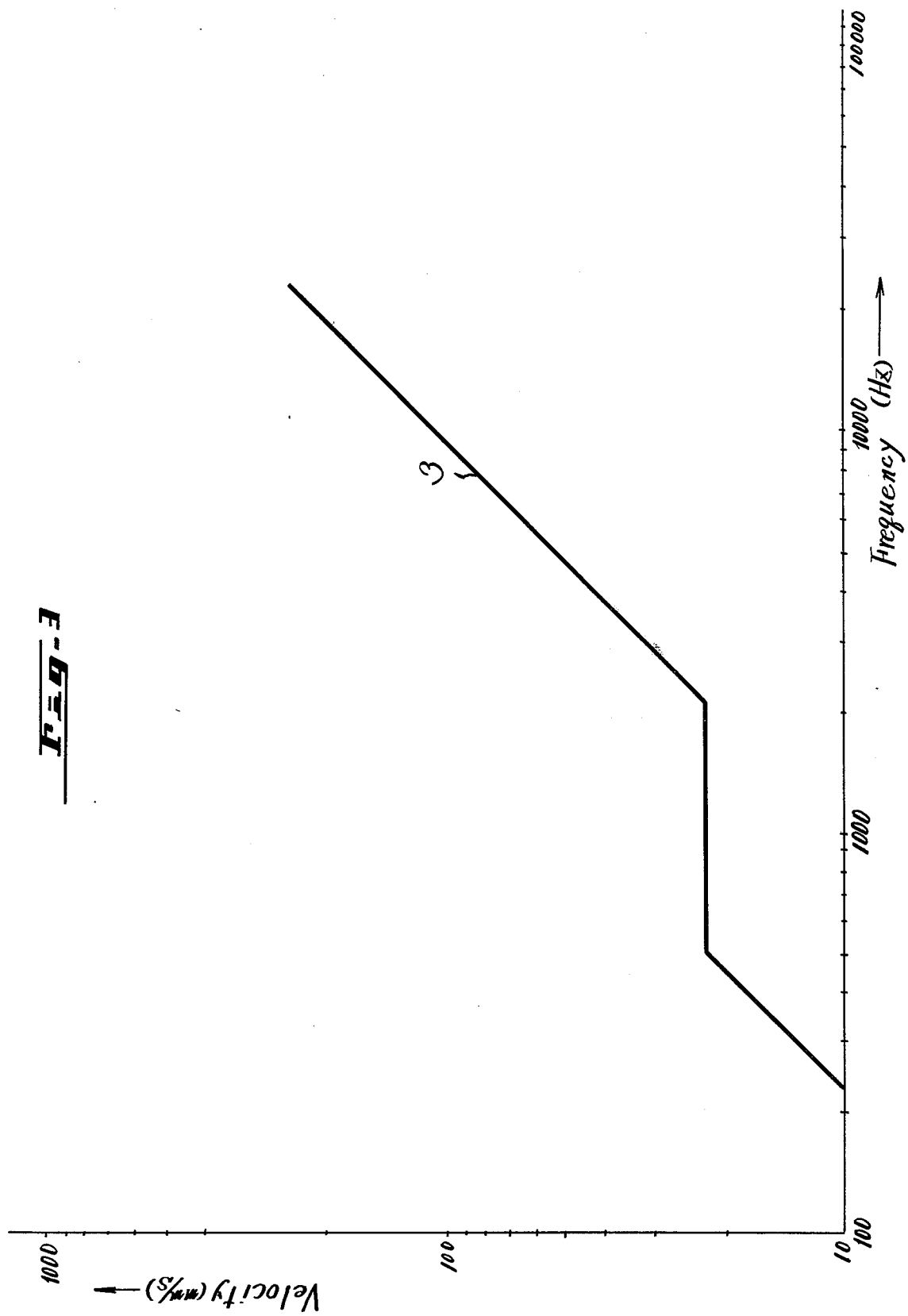

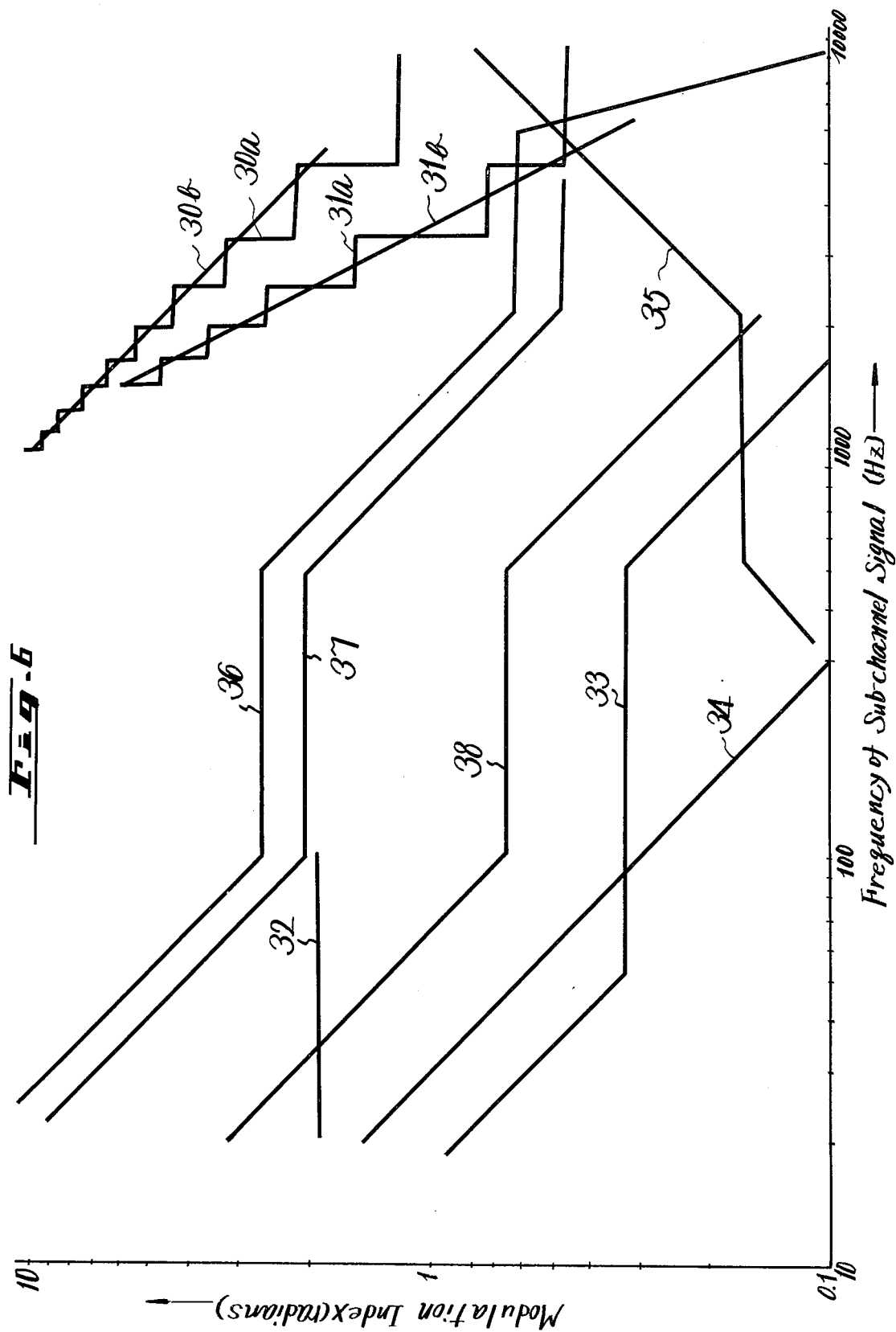

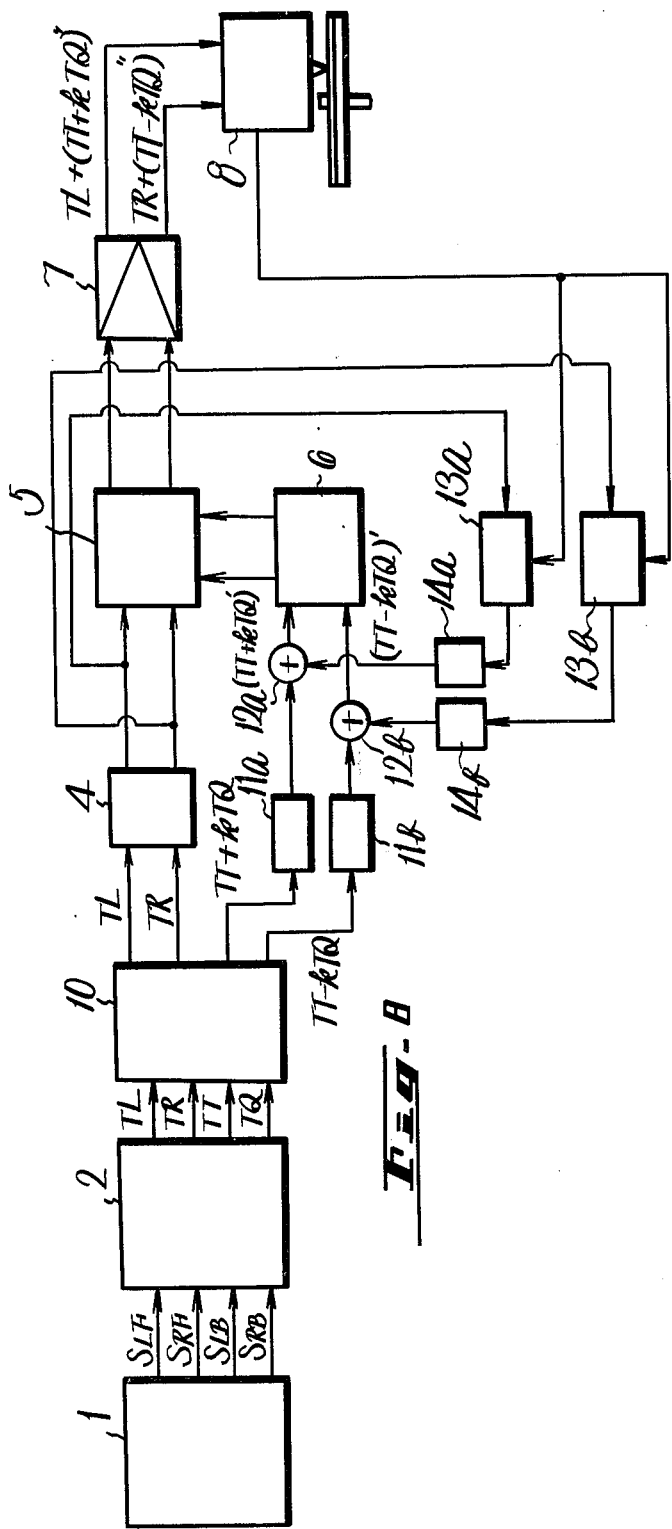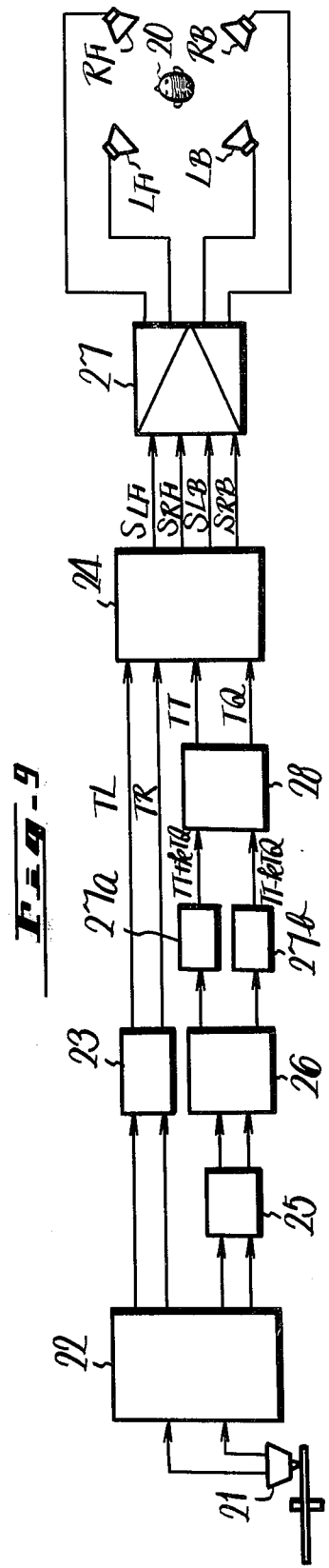

METHOD AND APPARATUS FOR CONTROL OF CROSSTALK IN MULTIPLE FREQUENCY RECORDING

This application is a continuation-in-part of application Ser. No. 187,065, filed Oct. 6, 1971, and now Pat. No. 3,856,992, and application Ser. No. 288,873, filed Sept. 13, 1972, and now Pat. No. 3,906,156.

The present invention relates generally to recording and reproducing systems, and more specifically to a method and apparatus for controlling distortion in multi-dimensional audio signals which have greater directional characteristics and improved ambience as compared with conventional stereo apparatus.

The present invention is generally directed to the sound recording and reproducing art which is popularly known as "four-channel stereo", which in the prior art is generally classified into three groups, such as a discrete system (4-4-4), a matrix system (4-2-4), and an artificial 4-channel system (2-2-4). Recently, the applicant of the present invention has proposed a "universal matrix system" (hereinafter referred to as the UM-system) which has many advantageous and desirable attributes when compared to the above mentioned prior art systems. The UM-system which is described in the above identified parent applications has many desirable features, such as good compatibility with monaural and ordinary 2-channel systems, faithful reproduction of sound sources, well positioned sound images and variable locations of loud speakers.

Referring to the drawings, an application of the UM-system will be described as applied to a 4-channel stereo apparatus. Referring specifically to FIG. 1, there is illustrated a block diagram including a recording-disc cutting system having a sound source 1. Four signals, namely, $S_{LF}$, $S_{RF}$, $S_{LB}$ are derived from the sound source from microphones which correspond to loud speakers LF, RF, LB, and RB located at four corners to form a square (2+2 disposition) and a listening space surrounding a listener 20 at a recording-disc reproducing system, such as shown in FIG. 5. The signals derived from the microphones corresponding to the loud speakers LF, RF, LB and RB are defined as $S_{LF}$, $S_{RF}$, $S_{LB}$, and $S_{RB}$, respectively. These four signals are applied to encoder 2 from which are derived signals TL, TR, TT, and TQ having the following relationships:

$TL = 0.924\ S_{LF}\ /+22.5° +0.383\ S_{RF}\ /+67.5° +0.383\ S_{RB}\ /-67.5° +0.924\ S_{LB}\ /-22.5°$ $TR = 0.383\ S_{LF}\ /-67.5° +0.924\ S_{RF}\ /-22.5° +0.924\ S_{RB}\ /+22.5° +0.383\ S_{LB}\ /+67.5°$ $TT = 1.414\ S_{LF}\ /+135° +1.414\ S_{RF}\ /+45° +1.414\ S_{RB}\ /-45° +1.414\ S_{LB}\ /-135°$ $TQ = 1.414\ S_{LF}\ /+90° +1.414\ S_{RB}\ /-90° +1.414\ S_{RB}\ /+90° +1.414\ S_{LB}\ /-90°$

The signals TL and TR are referred to the main-channel signals while the signals TT and TQ are sub-channel signals. These transmission signals are expressed in vector form in FIG. 2.

The main-channel signals TL and TR derived from the encoder 2 are fed through a recording equalizer 4 to the mixer 5. The characteristic of the recording equalizer is standardized in accordance with the RIAA recordng characteristic shown by a curve 3 in FIG. 3. The sub-channels TT and TQ are applied to an angular modulator 6 to angularly modulate a carrier frequency signal $f_c$. Thus, the angular-modulated carrier frequency signals $f_c$ are referred to as modulated sub-channel signals TT' and TQ'. These modulated channel signals TT' and TQ' are mixed with the main channel signals by mixer 5 to form two transmission signals TL + TT' and TR + TQ'. These two transmission signals are thereafter supplied through a recording amplifier 7 to a 45-45 cutter 8, similar to that used for producing a conventional stereo recording disc. The 45-45 cutter 8 engraves one face of a groove with a signal TL + TT' and the other face with the signal TR + TQ' as shown in FIG. 4. In other words, the groove is recorded at its one groove wall 9L with the main-channel signal TL and modulated sub-channel signal TT' and the other groove wall 9R is recorded with a main-channel signal TR and a modulated sub-channel signal TQ'.

Referring to FIG. 5, which illustrates a block diagram of a reproducing system for reproducing a recording disc, it should be understood that a reproducing signal from a pickup 21 is applied to a preamplifier 22. The main-channel signals TL and TR derived from the preamplifier 22 are supplied to a decoder 24 through a reproducing equalizer 23 with a characteristic that is reversed with respect to the recording equalizer 4. The modulated sub-channel signals TT' and TQ' supplied by the preamplifier 22 are passed through a bandpass filter 25 and are thereafter demodulated by an angular demodulator 26 to produce the sub-channel signals TT and TQ. The sub-channel signals TT and TQ are then fed to the decoder 24 together with the main channels TL and TR to produce the same signals as the audio signals $S_{LF}$, $S_{RF}$, $S_{LB}$, and $S_{RB}$ that were generated by the sound source 1. These four signals are then supplied to an amplifier 27 and thereafter to corresponding loudspeakers LF, RF, LB, and RB which are arranged in 2 + 2 disposition.

It is an object of the present invention to eliminate or substantially reduce crosstalk from a main-channel signal to a sub-channel signal that is caused by tracig tracing distortion produced in a higher frequency range of the sub-channel signal.

Other objects and advantages will become apparent upon reading the following detailed description, while referring to the attached drawings in which:

FIG. 1 is a block diagram showing one example of a recording-disc cutting system for multi-dimensional audio signals;

FIG. 2 is a series of vector diagrams of sub-channel signals encoded by the recording-disc cutting system;

FIG. 3 is a graph illustrating a RIAA-type recording characteristic for the main-channel signal;

FIG. 4 is a schematic view illustrating a recording-disc tracking system for producing multi-dimensional audio signals;

FIG. 5 is a block diagram of one example of a recording-disc reproducing system for multi-dimensional audio signals;

FIG. 6 is a graph illustrating various disturbance characteristics for the sub-channel signals and a modulation curve of the same;

FIG. 7 is a vector diagram of the difference between the encoded sub-channel signals TT and TQ;

FIG. 8 is a block diagram showing one embodiment of the recording-disc cutting system of the present invention; and FIG. 9 is a block diagram illustrating a recording-disc reproducing system that may be used to reproduce or play a recording disc made in accordance with the present invention.

In keeping with the present invention, the various problems that can occur when recording and reproducing multi-dimensional audio signals of the type mentioned herein are described. There is a limit to the amount of frequency deviation that can be permitted. Overmodulation of a carrier signal which is mixed with a lower frequency range signal may be caused when the frequency deviation exceeds the frequency limit that is determined with respect to the modulated sub-channel. However, when the carrier signal is modulated by a higher frequency range signal, the modulated sub-channel will have a frequency spectrum which is wider than the frequency deviation. The largest frequency deviation that is permissible so that 5% of the carrier energy is spread beyond the bands of 10 K Hz at both ends is formed in a step-shape shown by the curve 30a in FIG. 6. The curve 30b of FIG. 6 illustrates the carrier frequency from which the deviation curve 30a is based. When the modulated sub-channel signals pass through the bandpass filter 24 shown in FIG. 5, which is used to separate the sub-channel signals in the reproducing system, the modulation distortion occurs.

When respect to harmonic distortion, a limit of, for example, 5% results in a stepped-shape as shown by the curve 31a in FIG. 6. In the event a symmetrical filter is used, the harmonic distortion becomes an odd-order type, while a single band type filter would produce an even-ordered harmonic distortion, the straight line 31b illustrating its general characteristic. The modulation curve of a sub-channel signal cannot exceed the curves 30a and 30b without producing unacceptable distortion.

Additionally, when crosstalk is present between modulated sub-channel signals, beat distortion occurs in the demodulated sub-channel signals. Crosstalk occurs in general when a signal is recorded on and reproduced from a recording disc and is generated from the cutter head, cutting stylus and the like. To substantially eliminate crosstalk during the recording of a disc, it is generally necessary to employ a high quality cutter head cutting stylus and the like. During reproduction, crosstalk is produced when a signal is picked up from a groove of the recording disc by a pickup device and it is difficult to record a disc during production that will result in virtual removal of crosstalk produced by the pickup device. Moreover, the generation of beat distortion produced by crosstalk of the carrier frequency band that is nonlinear and gives rise to complex harmonic and inter-modulation distortions if the relative phase deviations are large. That is, if the crosstalk between groovewalls is in phase, the distortion is of an odd order and is proportional to $J_{2n-1}(x)/x$ ($n$ indicates a positive integer), if $x$ is the peak phase difference. If the crosstalk between groovewalls is quadrature phase, the distortion is of even order and is proportional to $J_{2n}(x)/x$, where $n$ indicates a positive integer and $J_n(x)$ is a first-kind $n$-order Bessel Function. In these cases, the distortion is proportional to the magnitude of the crosstalk. As examples, for an $x$ value of 3.6 the component $J_3(x)/x$ becomes maximum, while for an $x$ value of 2.3 the component $J_2(x)/x$ becomes maximum, and the component $J_2(x)/x$ is equal to the component $J_3(x)/x$ at a value of 3.8. The harmonic distortion in this case is about 2% with the crosstalk being −20dB. The low and high order distortions are critically generated at the modulation index of 3.8 radians, which is the modulation index difference of the critical level and it is half the difference that is shown by the line 32 in FIG. 6. When the modulation curve of the sub-channel signal exceeds the line 32, the beat distortion is increased.

There is also crosstalk from the main-channel signal to the sub-channel signal which is caused during reproduction, and this type of crosstalk is referred to as uptalk, which is produced by both tracking angle-error an tracing error. The other type of crosstalk, i.e., from a sub-channel signal to a main-channel signal, is referred to as downtalk. The downtalk is significant in the tracing-error process, but is no significant when the modulated sub-channel signal is recorded at a constant velocity.

Uptalk produced from tracking angle-error is produced if displacement of the modulated sub-channel signal is small as compared with that of the main-channel signal and the modulated sub-channel signal is subjected to phase modulation of $2\pi/\lambda c$ $am$ tan $\phi$, where $am$ denotes displacement of the main channel signal, $\lambda c$ is the wavelength of carrier signals and $\phi$ is the tracking error angle. Uptalk caused by vertical tracking error angle, for example, is produced mainly by the vertical or difference signal component of the main-channel signal. If the main-channel signal is recorded according to the RIAA-recording characteristics shown by the curve 3 of FIG. 3, uptalk from vertical tracking angle of 5° would be produced with a limit shown by 33 in FIG. 6.

Further, the demodulated signal produces a rumble-type distortion caused by revolving irregularity, i.e., flutter independent of the influence of the main-channel signal, which is analogous to uptalk. The distortion of, for example, 0.1% flutter of the sub-channel is shown by line 34 in FIG. 6 and, accordingly, the modulation curve of the sub-channel signal should be separated from the lines 33 and 34. Additionally, tracing error uptalks are produced from the main-channel signals to the sub-channel signals, respectively, at two groove walls and the total sum of these uptalks are shown by curve 35 of FIG. 6. The curve 35 results when the recording speed is at 11.15 mm/sec and the stylus radius is 5 microns.

As previously mentioned, the sub-channel signal is affected by the rumble-type distortion (characteristic 34) in the demodulated signal caused by revolving irregularity, tracking angle-error uptalk (line 33) and beat distortion (line 32) by crosstalk between sub-channel signals. Further, in intermediate- and higher-frequency ranges, the sub-channel signals are affected by tracing-error uptalk (line 35) and clipping distortion (line 31b) due to frequency-band limit. The uptalks (lines 33 and 35) produced by the main-channel signal, the beat distortion (line 32) caused by crosstalk between the sub-channel signals and the clipping distortion (line 31b) by frequency-band limit are generally called as cross-over modulation distortion.

As previously mentioned, the present invention involves a method and apparatus particularly adapted to reduce uptalk (line 35) due to tracing distortion produced in a higher frequency range of the sub-channel signal.

The uptalk by tracing distortion is produced due to the fact that the tip of pickup stylus has some finite radius when the pickup reproduces a recording disc. The tracing distortion uptalk is a function of the recording-disc groove speed S (cm/sec), the peak velocity v(cm/sec) of the main-channel signal at a groove and reproducing stylus tip spherical radius $r$ (cm). If the amount of sub-channel signal subjected to phase modulation is expressed by phase modulation index $m$, the following equation is satisfied:

$$m = \frac{rv\omega}{S^2}$$

where $\omega$ indicates carrier angular frequency. If the groove diameter is taken as D ($cm$) and its revolving number per minute as N, the groove speed S is expressed as follows:

$$S = \frac{\pi DN}{60} (cm/sec).$$

In the case when the main-channel signal is equalized by the recording RIAA-type characteristic shown in FIG. 3 and the recording-disc diameter is constant, the phase modulation index m is increased according to the main-channel signal frequency.

Based upon the above considerations, the present invention involves subtracting an estimated amount of uptalk that should be caused by tracing distortion at the recording-disc cutting system when the sub-channel signal is phase-modulated, to thereby remove this uptalk when the recorded disc is thereafter played or reproduced.

One embodiment of the recording-disc cutting system of the present invention is shown in FIG. 8 to use two sub-channel signals TT + $k$TQ and TT − $k$TQ which are formed by a matrix circuit 10. These sub-channel signals TT + $k$TQ and TT − $k$TQ are respectively applied to emphasis circuits 11a and 11b which characteristics are selected so that the modulation curve of the sub-channel signal will be identical to line 36 in FIG. 6. and thereby remove the aformentioned cross-modulation distortion.

In other words, the modulation line or curve 36 of the sub-channel signal is compensated such that it is separated from lines 32, 33 and 34 in a lower-frequency range and located at an intermediate value between lines 31b and 35 in intermediate- and higher-frequency ranges. As a whole, the characteristics of emphasis circuits 11a and 11b for obtaining such a modulation curve 36 are made similar to the recording RIAA-type characteristic of the main-channel signal shown in FIG. 3 to achieve good separation during reproducing.

It is for the purpose of reducing the above-mentioned influence due to beat distortion that the two signals TT + $k$TQ and TT − $k$TQ are used as the sub-channel signals. That is, the sub-channel signals TT and TQ in the case of UM-system are produced as shown in FIG. 2, so that difference level of TT-TQ corresponding to the relative phase deviation of these two sub-channel signals as shown in FIG. 7. In this case, generation of the beat distortion is varied according to sound source positions. Accordingly, if the two signals TT + $k$TQ and TT − $k$TQ are selected as the sub-channel signals, their relative phase deviation becomes 2$k$TQ. As a result, the relative phase deviation becomes uniform in distribution according to the sound source positions and becomes small in amplitude as compared with that in the case of TT − TQ.

In consideration of the above aspects, the present invention involves selecting the two sub-channel signals to increase the same-phased component and to decrease the reversely-phased component, the modulation curve being shown by a line 36.

Further, in FIG. 6, line 37 denotes a modulation curve for the case of $k = ⅓$ with respect to the same-phased component TT between these sub-channel signals TT + $k$TQ and TT − $k$TQ, and line 38 a modulation curve for the case of $k = ⅓$ with respect to their reversely-phased component $k$TQ.

These sub-channel signals TT + $k$TQ and TT − $k$TQ are supplied to adder circuits 12a and 12b to which are supplied the main-channel signals for correction. These main-channel signals are corrected by the following process, i.e., the main-channel signals TL and TR from an equalizer 4 are supplied to level control circuits 13a and 13b, respectively. The control circuits are also supplied with a control voltage in association with operation of cutter lathe of 45-45 cutter 8. The outputs of these level control circuits 13a and 13b compensated so that they are equal to the above described tracing distortion component expressed by the equation $m = rv\omega/S^2$. These outputs of level control circuits 13a and 13b are then supplied to inversion circuits 14a and 14b, respectively. The output of inversion circuit 14a, i.e., the main-channel signal for correction, is applied to the adder circuit 12a for addition to the sub-channel signal TT + $k$TQ which is recorded on the same groovewall of recording disc. Concurrently, the output of the inversion circuit 14b, i.e., the main-channel signal for correction, is applied to the adder circuit 12b for addition to the sub-channel signal TT − $k$TQ which is recorded on the same groovewall.

Thus, the anticipated tracing distortion is reversely corrected or compensated to form sub-channel signals (TT + $k$TQ)' and (TT − $k$TQ)' which are then applied to a phase modulator 6. The modulated sub-channel signals (TT + $k$TQ)" and (TT − $k$TQ)" from the phase modulator 6 are added to the main-channel signals at a mixer 5 to produce two signals TL + (TT + $k$TQ)" and TR + (TT − $k$TQ)". These signals are supplied through an amplifier 7 to the 45-45 cutter 8 and recorded on right and left groovewalls of the groove.

A recording-disc reproducing system for reproducing a recording disc on which a signal is recorded by the embodiment of this invention is shown by a block diagram of FIG. 9. The modulated sub-channel signal separated by a band-pass filter 25 from a reproducing signal derived from a pickup 21 is applied to an FM demodulator 26. A demodulated output from the FM demodulator 26 is supplied to a matrix circuit 28 through emphasis circuits 27a and 27b which are the reverse characteristic to those of the emphasis circuits 11a and 11b of the recording-disc cutting system. The matrix circuit 28 produces sub-channel signals TT and TQ which are applied to a decoder 24 together with the main-channel signals TL and TR. The decoder 24 delivers audio signals $S_{LF}$, $S_{RF}$, $S_{LB}$ and $S_{RB}$ corresponding to the specifically disposed sound sources which are respectively amplified and supplied to loudspeakers LF, RF, LB and RB.

Thus, in accordance with the present invention, when a recording disc is cut, a sub-channel signal is reversely compensated by an anticipated amount of tracing distortion, so that uptalk is substantially prevented from being generated when the recorded disc is reproduced or played.

When the main-channel signals for correction are formed it is necessary that the main-channel signals supplied to the level control circuits 13a and 13b be equal to those finally recorded on groovewalls of a groove. Accordingly, in order to insure the above equality the main-channel signals may be supplied through equalizers or the like to the level control circuits 13a and 13b. It will be easily understood that the present invention is applicable to the other systems than the UM-system. Moreover, while the present invention is susceptible to various other modifications and alternative constructions, certain preferred embodiments are shown and described herein. It should be understood however, that it is not intended to limit the invention to the specific forms disclosed. On the contrary, it is intended that all substitutions, equivalents and modifications be covered as may be included within the spirit and scope of the present invention as expressed in the appended claims.

I claim:

1. Apparatus for recording 4-channel signals as main channel and frequency modulated subchannel signals on two groovewalls of a recording disc with compensation for main channel to subchannel crosstalk resulting from playback tracing distortion, comprising matrixing means for providing first and second main channel signals and first and second subchannel signals, said matrixing means having directional coefficients of differing amplitude and phase characteristics for providing differing linear combinations of directional audio signals for encoding at least three of the audio signals in each of said main channel and said subchannel signals, first main channel input means for said first main channel signal, second main channel input means for said second main channel signal, first subchannel input means for said first sub-channel signal to be recorded on a first recording disc groovewall with said first main channel signal, second subchannel input means for said second subchannel signal to be recorded on a second recording disc groovewall with said second main channel signal, first subtracting means for subtracting a predetermined amount of said first main channel signal from said first subchannel signal to provide a first compensated subchannel signal, second subtracting means for subtracting a predetermined amount of said second main channel signal from said second subchannel signal to provide a second compensated sub-channel signal, means for angularly modulating a carrier signal with said first and second compensated subchannel signals to provide a first angularly modulated subchannel signal and a second angularly modulated subchannel signal, means for adding said first angularly modulated signal and said first main channel signal to provide a recording signal for said first groovewall, means for adding said second angularly modulated sub-channel signal and said second main channel signal to provide a recording signal for said second groovewall, and recording means for recording said first and second recording signals on the first and second groovewalls of a recording disc.

2. Apparatus in accordance with claim 1 wherein said first and second subtracting means subtract an amount, in terms of phase modulation index m, of the respective first and second main channel signals which respectively correspond to $rv\omega/S^2$ where $r$ is the reproducing stylus tip spherical radius, $v$ is the peak velocity of the respective main channel signal at a groovewall, $\omega$ is the carrier angular frequency, and $S$ is the recording disc groove speed.

3. Apparatus in accordance with claim 2 further including matrixing means for providing main channel signals TL and TR and subchannel signals TT and TQ in accordance with the UM matrixing system.

4. Apparatus in accordance with claim 3 further including means for matrixing signals TT and TQ to provide said first and second subchannel signals as TT + $k$TQ and TT−$k$TQ where $k$ is ⅓.

5. Apparatus in accordance with claim 4 further including a recording equalizer for the main channel signals standardized in accordance with the RIAA recording characteristic and emphasis circuits for said first and second subchannel signals which have a characteristic corresponding to the RIAA recording characteristic.

6. A two groovewall, uptalk compensated recording disc having 4-channel signals recorded thereon as main channel and frequency modulated subchannel signals matrixed with directional coefficients of differing amplitude and phase characteristics providing differing linear combinations of directional audio signals, at least three of the audio signals being encoded in each of said main channel and subchannel signals, and in which one main channel and one frequency modulated subchannel are recorded on each groovewall of the recording disc, wherein each of said recorded subchannel signals is compensated for anticipated tracing distortion error by a predetermined inverse amount of the main channel signal recorded on the same groovewall therewith as a modulation index component.

7. A recording disc in accordance with claim 6 wherein the predetermined amount of each main signal which is inversely compensated as a modulation index component in the respective frequency modulated subchannel signal in terms of phase modulation index m, corresponds to $rv\omega/S^2$ where $r$ is the reproducing stylus tip spherical radius, $v$ is the peak velocity of the respective main channel signal at a groovewall, $\omega$ is the carrier angular frequency and $S$ is the recording disc groove speed.

8. A recording disc in accordance with claim 7 wherein the main channel signals are TL and TR and wherein the subchannel signals are TT + $k$TQ and TT − $k$TQ where $k$ is ⅓, matrixed in accordance with the UM matrixing system.

9. A recording disc in accordance with claim 8 wherein the recorded main channel signals are emphasized in accordance with the RIAA recording characteristic and wherein the modulation index of the recorded subchannel signals is emphasized with a characteristic corresponding to the RIAA characteristic.

10. A method for recoding 4-channel signals on a two groovewall record disc as main channel and frequency modulated subchannel signals comprising providing first and second main channel signals and first and second subchannel signals by matrixing source signals with directional coefficients of differing amplitude and phase characteristics for producing differing linear combinations of directional audio signals, and encoding at least three of the audio signals in each of the main channel and subchannel signals, subtracting a predetermined amount of said first main channel signal from said first subchannel signal to provide a first compensated subchannel signal, subtracting a predetermined amount of said second main channel signal from said first main channel signal to provide a second compensated subchannel signal, angularly modulating a carrier signal with said first and second compensated subchannel signals to provide a first angularly modulated subchannel signal and a second angularly modulated subchannel signal, adding said first angularly modulated signal and a first main channel signal to provide a recording signal for a first groovewall, adding said second angularly modulated subchannel signal and a second main channel signal to provide a recording signal for a second groovewall, and recording said first and second recording signals on the first and second groovewalls of a recordin disc.

11. A method in accordance with claim 10 wherein said predetermined amounts of the first and second main channel signals which are respectively subtracted from the first and second subchannel signals, in terms of phase modulation index m, correspond to $r v \omega / S^2$ where $r$ is the reproducing stylus tip spherical radius, $v$ is the peak velocity of the respective main channel signal at a groovewal, $\omega$ is the carrier angular frequency, and S is the recording disc groove speed.

12. A method in accordance with claim 11 further including the steps of providing main channel signals TL and TR and subchannel signals TT + $k$TQ and TT− $k$TQ where $k$ is ⅓, matrixed in accordance with the UM matrixing system.

13. A method in accordance with claim 12 wherein the main channel signals are emphasized in accordance with the RIAA recording characteristic and wherein the modulation index of the subchannel signals is emphasized with a characteristic corresponding to the RIAA characteristic.

* * * * *